(12) United States Patent
Buscaglia

(10) Patent No.: US 6,193,249 B1
(45) Date of Patent: Feb. 27, 2001

(54) TURNING MECHANISM FOR TANDEM WHEELED VEHICLES AND VEHICLES EMPLOYING THE SAME

(76) Inventor: Salvatore Buscaglia, 340 Daniel Ave., N. Tonawanda, NY (US) 14120

( * ) Notice: Subject to any disclaimer, the term of this patent is extended or adjusted under 35 U.S.C. 154(b) by 319 days.

(21) Appl. No.: 08/675,445

(22) Filed: Jul. 3, 1996

(51) Int. Cl.[7] .................................................. B62M 1/00
(52) U.S. Cl. .................... 280/87.042; 16/35 D; 280/11.23; 280/11.28
(58) Field of Search .......................... 280/87.042, 11.19, 280/11.22, 11.23, 11.25, 11.27, 11.28, 842; 16/35 D (56) References Cited

U.S. PATENT DOCUMENTS

| | | | |
|---|---|---|---|
| 200,186 | * 2/1878 | Forsyth | 280/11.28 |
| 277,911 | * 5/1883 | Lutz | 280/11.28 |
| 920,848 | * 5/1909 | Eubank, Jr. | 280/11.23 |
| 1,123,686 | * 1/1915 | Cole et al. | 280/87.042 |
| 1,778,850 | 10/1930 | Duisenberg . | |
| 2,529,314 | * 11/1950 | Schmid | 280/11.23 |
| 2,545,543 | 3/1951 | Bottrill . | |
| 2,719,724 | * 10/1955 | Lundgren | 280/11.23 |
| 3,649,038 | * 3/1972 | Huckenbeck | 280/11.28 |
| 3,827,706 | 8/1974 | Milliman . | |
| 3,963,252 | 6/1976 | Carlson . | |
| 4,134,598 | 1/1979 | Urisaka . | |
| 4,351,538 | * 9/1982 | Berta | 280/11.28 |
| 5,082,300 | 1/1992 | Cucurullo . | |
| 5,114,166 | * 5/1992 | McCosker | 280/87.042 |
| 5,183,277 | * 2/1993 | Tang | 280/11.28 |
| 5,263,725 | * 11/1993 | Gesmer et al. | 280/87.042 |
| 5,398,949 | 3/1995 | Tarng . | |

FOREIGN PATENT DOCUMENTS

| | | | | |
|---|---|---|---|---|
| 4196 | * 12/1875 | (GB) | | 280/11.28 |
| 542 | * 2/1876 | (GB) | | 280/11.19 |
| 117270 | * 3/1919 | (GB) | | 280/11.19 |

* cited by examiner

*Primary Examiner*—Eric Culbreth
(74) *Attorney, Agent, or Firm*—The Bilicki Law Firm, P.C.

(57) ABSTRACT

A steering mechanism is provided for tandem wheeled vehicles. The steering mechanism employs casters that are capable of swivelling. The casters are attached to a base member and a pair of resilient members is used to provide control over the degree of swivel of the casters. When turning, the caster rotates in the direction of turn and is restricted by the resilient members. The degree of rotation which the caster is allowed depends on the resilience of the resilient members and the force being applied to motivate the turn. A skateboard is also provided which incorporates the steering mechanism.

3 Claims, 8 Drawing Sheets

TURNING MECHANISM FOR TANDEM WHEELED VEHICLES AND VEHICLES EMPLOYING THE SAME

BACKGROUND OF THE INVENTION

The present invention relates to turning mechanisms for wheeled vehicles. The invention is specifically concerned with those turning mechanisms capable of being adapted to tandem wheeled vehicles.

Many attempts have been made in the past to incorporate turning capabilities in vehicles equipped with tandem wheels. In general, vehicles equipped with tandem wheels are incapable of turning while all the wheels are on the ground. In-line roller skates, for example, suffer from this inconvenience. Typical in-line roller skates employ an arrangement in which three to five wheels are placed in tandem. One of the biggest drawbacks of the in-line roller skate is that the operator is incapable of making right or left turns during single foot skating. Skateboards typically overcome this problem by employing a plurality of suspension frames which carry a wheel on either side, Turning is subsequently accomplished by movement of the suspension frame and not the wheels themselves. A variety of spring and tension assemblies have been employed by the prior art to control the turning of wheels in vehicles where the wheels are in tandem, but these devices are often complicated and difficult to manufacture economically. Accordingly, a simple and inexpensive turning mechanism would be beneficial for tandem wheeled vehicles.

Several designs have been proposed by the prior art to eliminate the problems associated with the turning of tandem wheeled vehicles. For example, U.S. Pat. No. 5,398,949 discloses a roller skate having a steering mechanism which allows the operator to execute figure skating maneuvers. The roller skate includes a steering cushion mechanism and a pivotal-turntable brake wheel mechanism. The steering cushion mechanism utilizes either a combination of screws and springs, or resilient members in conjunction with the axle of each wheel. In certain instances, a combination of resilient members, screws, and springs is utilized. However, the mechanism is still somewhat complicated because the frame must be designed to accommodate all of the additional parts.

U.S. Pat. No. 4,382,605 shows a steering mechanism for tandem wheeled vehicles. The mechanism includes a frame to which a pair of suspension members is attached. Two subsuspension members are also attached to the frame, one at each point of attachment of the suspension members. Each subsuspension member carries two wheels. The subsuspension members allow their respective sets of wheels to turn and follow a curved path dictated by the operator. However, the steering mechanism requires the addition of a suspension member and a subsuspension member, both of which must be attached to the base. These additional members increase the number of parts and create a more complex system.

U.S. Pat. No. 1,778,850 shows a roller skate suitable for figure skating. The roller skate includes a main wheel which is centrally positioned below the skate and a pair of auxiliary wheels, such as casters, at the front and rear positions of the skate. The auxiliary wheels are typically of smaller diameter than the main wheel and capable of swivelling. However, the auxiliary wheels are free to swivel uncontrolled, thereby creating an imprecise control system.

While the foregoing arrangements address the need for providing simple and inexpensive turning capabilities to tandem wheeled vehicles, the problem persists. Most of the prior art focuses on arrangements suitable only for roller skates and figure skating. Others are unable to adequately provide a mechanism that is simple and easy to manufacture. Consequently, it remains difficult to turn tandem wheeled vehicles.

OBJECTS AND SUMMARY OF THE INVENTION

Accordingly, it is an object of this invention to overcome the disadvantages of the prior art.

It is another object of this invention to provide a steering mechanism for tandem wheeled vehicles.

It is yet another object of this invention to provide a steering mechanism for tandem wheeled vehicles which is simple in design.

It is yet another object of this invention to provide a steering mechanism for tandem wheeled vehicles that is inexpensive to manufacture.

In accordance with the objects of this invention, a turning mechanism is provided for vehicles equipped with tandem wheels. The turning mechanism includes a base with a bottom surface to which a caster is mounted. The caster includes an axle and a wheel which is mounted on the axle. Since casters are well known in the field, a detailed description of casters and their components will not be provided. Only the parts essential to providing an understanding of the invention are described. A pair of rotation limiters having resilient properties is positioned with each rotation limiter on one side of the caster. Each rotation limiter is attached at one end to the respective end of the axle corresponding to its position on the side of the caster. The opposite end of each rotation limiter is attached to the bottom surface of the base. Each of the rotation limiters applies a tension force to one side of the caster. The tension force applied by each individual rotation limiter is equal and the tension tends to force the caster to swivel in the direction of that particular rotation limiter. Since this tension force is equal for each of the rotation limiters, the net result is that the two tension forces cancel each other and the caster remains in a straight orientation.

In order to execute a turn, the base is tilted in the desired turning direction. This action forces the caster to swivel in the same direction. The force applied by the tilted base also increases the tension on one of the rotation limiters; the one opposite of the turning direction. This increased tension acts on the caster to reduce the degree of swivelling which would freely occur.

The rotation limiters provide a certain level of stability to the overall operation of the steering mechanism. First, the rotation limiters maintain the caster in a straight orientation. Next, the rotation limiters prevent the caster from swivelling excessively during turns. In order to accomplish this task, it is evident that there are a variety of materials with resilient properties that are capable of being substituted while performing the same function. For example, a band having elastomeric properties may function as a rotation limiter. As yet another example, a spring could also function as a rotation limiter.

In one embodiment of the invention, the turning mechanism is provided with a mounting plate attached to the bottom surface of the base. The mounting plate provides a reinforced surface for attaching the caster. This may be necessary in situations where the material from which the base is constructed is incapable of withstanding the forces that will act upon it during regular operation.

In an application of the invention, a skateboard is equipped with the turning mechanism. The skateboard includes a base which has a bottom surface, a front portion, and a rear portion. A first caster is rotated so that it is facing forwardly and positioned at the front portion of the base. The first caster is then secured to the bottom surface of the base. The first caster includes a first axle and a first wheel which is mounted on the first axle.

A first pair of rotation limiters is positioned with each rotation limiter on one side of the first caster. Each of the first pair rotation limiters is attached at one end to the corresponding end of the first axle. The opposite end of each of the first pair of rotation limiters is attached to the bottom surface of the base. The rotation limiters are preferably selected such that they have resilient properties. Each of the first pair of rotation limiters applies a tension force to the first caster which urges it to rotate in the direction of the rotation limiter. The tension forces applied by each of the first rotation limiters react with each other and cancel. The net result is that the first caster remains in a straight orientation when the base is in a horizontal position.

A second caster is rotated so that it is facing rearwardly and positioned at the rear portion of the base. The second caster is then secured to the bottom surface of the base. The second caster includes a second axle and a second wheel mounted on the second axle. A second pair of rotation limiters is positioned with each rotation limiter on one side of the second caster. Each rotation limiter of the second pair of rotation limiters is attached at one end to the corresponding end of the second axle. The opposite end of each of the second pair of rotation limiter is attached to the bottom surface of the base. Each of the second pair of rotation limiters applies a tension force to the second caster which urges it to rotate in the direction of that particular rotation limiter. The two tension forces react with each other and cancel so that the second caster remains in a straight orientation.

In order to turn, the base is tilted in the desired turning direction. The first caster responds by swivelling in the same direction. The second caster, on the other hand, swivels in the opposite direction. The force applied by the base also places an increased tension in two of the rotation limiters, one rotation limiter from the first pair and one rotation limiter from the second pair. These increased tensions act to respectively reduce the degree of swivelling which would normally occur in the first and second casters.

The above and many other objects, features and advantages of this invention will be better understood from the ensuing description of selected preferred embodiments, which should be read in conjunction with the accompanying drawings.

BRIEF DESCRIPTION OF THE DRAWINGS

FIG. 6b is a bottom plan view of a skateboard during a turn.

FIG. 7b is a bottom plan view of another embodiment of the skateboard during a turn.

DETAILED DESCRIPTION OF THE PREFERRED EMBODIMENTS

Figure 1A:
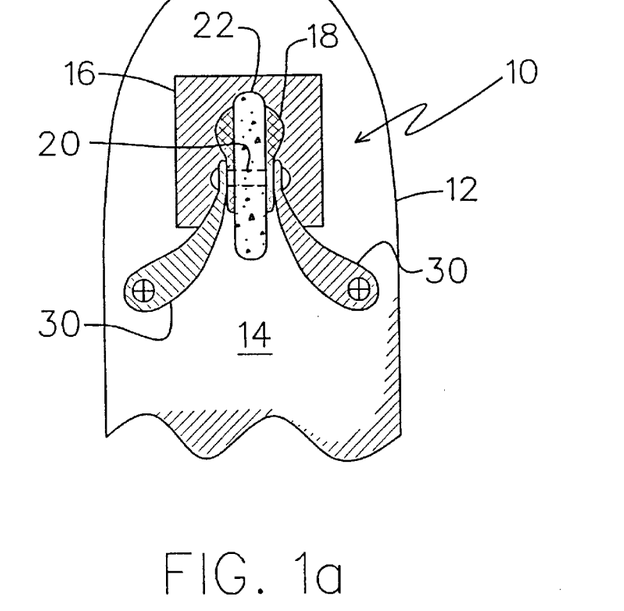
FIG. 1a is a bottom plan view of the turning mechanism.
Figure 1B:
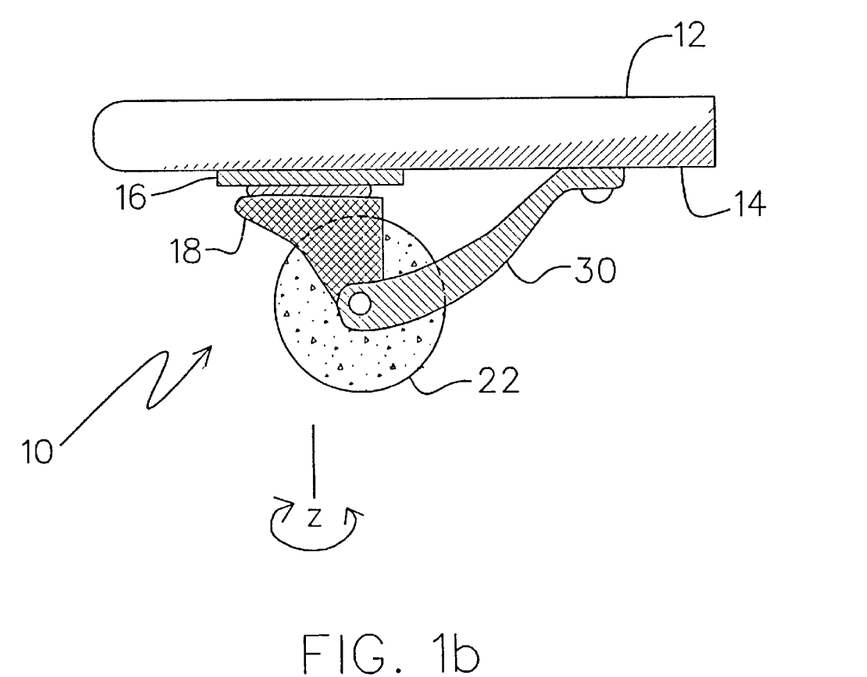
FIG. 1b is a side elevational view of the turning mechanism.

With reference to the drawing, and initially to FIGS. 1a and 1b, a turning mechanism 10 is shown mounted to a base 12 which includes a bottom surface 14. The base 12 can take on a variety of shapes and may be composed of various materials depending on the specific application. A mounting plate 16 is attached to the bottom surface 14 of the base 12. A caster 18 is secured to the mounting plate 16. The mounting plate 16 provides a reinforced surface for securing the caster 18. The mounting plate 16 may be made of any appropriate material capable of providing the necessary wear resistance. For example, a metal or composite material could be used if capable of providing the necessary features.

The caster 18 includes an axle 20 to which a wheel 22 is mounted. The caster 18 is capable of rotating about a swivel axis z. A rotation limiter 30 is positioned on each side of the caster 18. In a preferred embodiment, the rotation limiter may be an elastomeric band. Each rotation limiter 30 is attached at one end to the bottom surface 14 of the base 12. The opposite end of each rotation limiter 30 is attached to the corresponding end of the axle 20. As seen in FIG. 1B, the swivel axis z is offset from the point of ground contact of the wheel 22. Each rotation limiter 30 exerts a tension force on the caster 18 which urges it to rotate in the direction of the rotation limiter 30. The rotation limiters 30 perform two basic functions for the steering assembly 10. First, the rotation limiters 30 maintain the caster 18 in a straight orientation when the base 12 is positioned horizontally. Second, the rotation limiter 30 prevent the caster 18 from swivelling freely during turns.

Figure 2A:
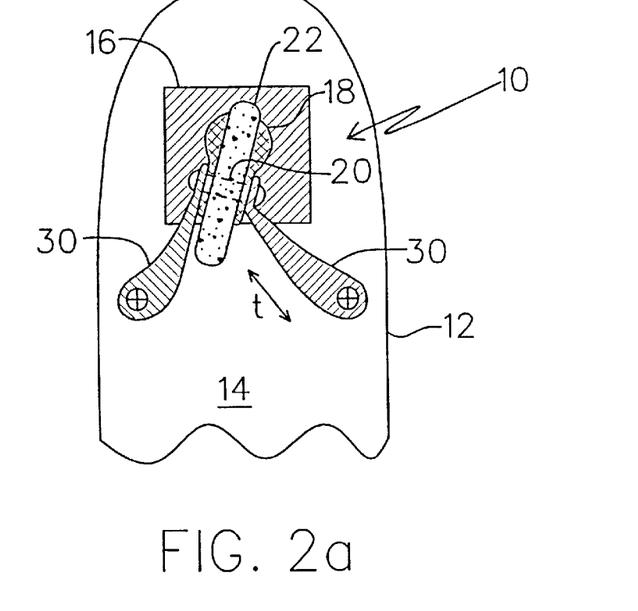
FIG. 2a is a bottom plan view of the turning mechanism during a turn.
Figure 2B:
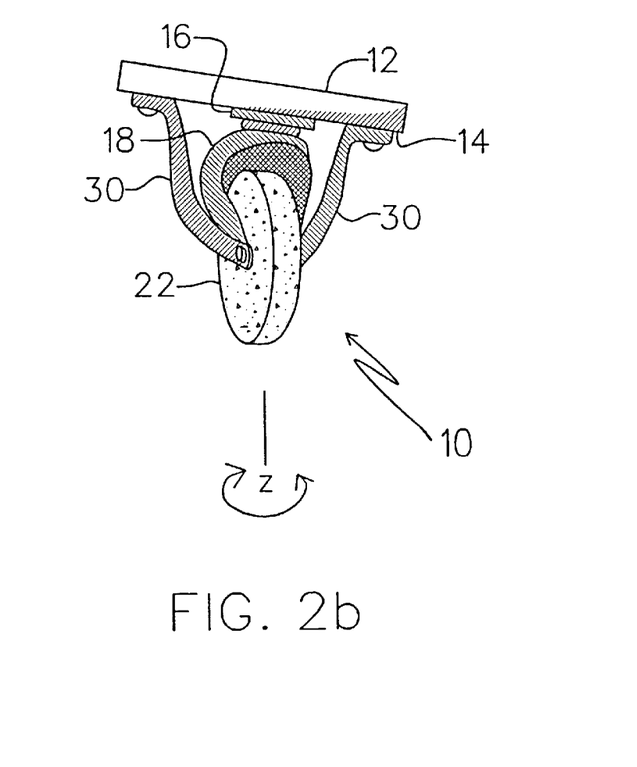
FIG. 2b is a front view of the turning mechanism during a turn.

Turning now to FIGS. 2a and 2b, the turning mechanism 10 is illustrated while engaged in a turning maneuver. With particular reference to FIG. 2b, the base 12 of the turning mechanism 10 is shown tilted in the direction of turn. As a result, the caster 18 is forced to swivel in the direction of the turn. A resulting tension t is maintained on the rotation limiter 30 which is in the direction of the turn. The tension t reacts with the caster 18 to minimize the degree of swivelling which takes place during the turn.

Figure 3A:
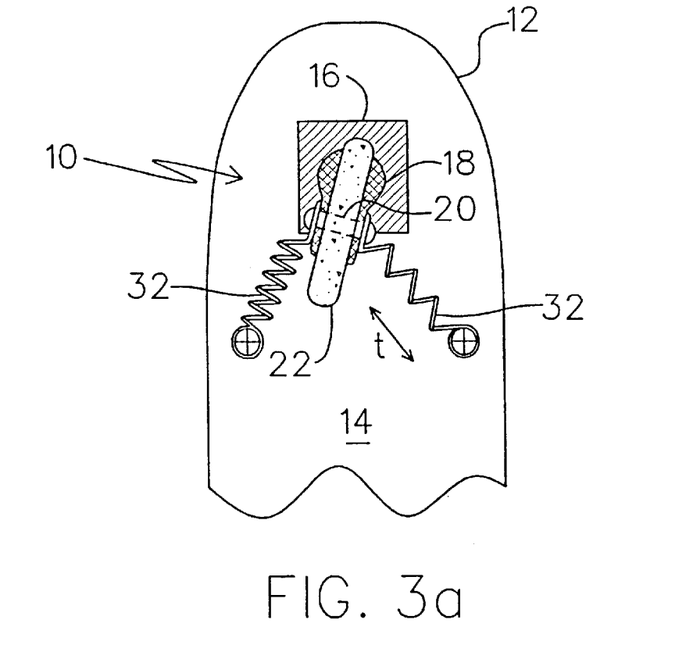
FIG. 3a is a bottom plan view of another embodiment of the turning mechanism during a turn.
Figure 3B:
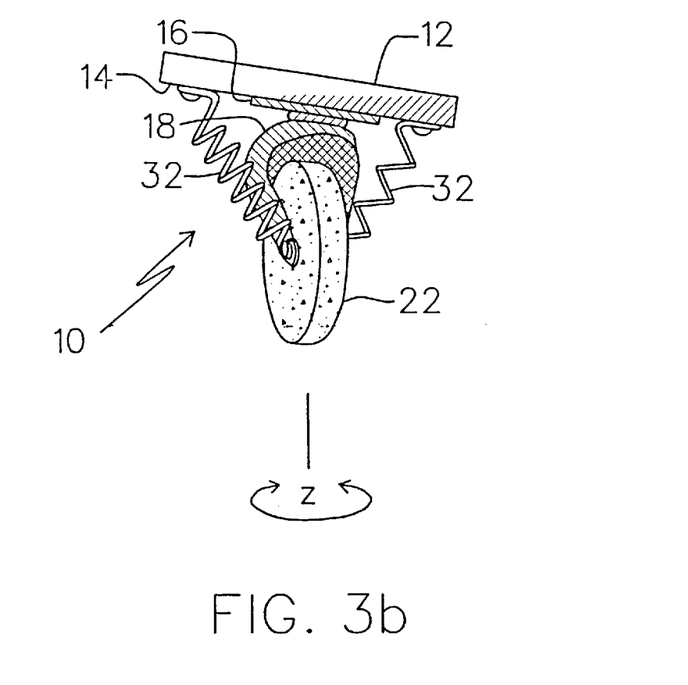
FIG. 3b is a front elevational view of the same embodiment during a turn.

FIGS. 3a and 3b illustrates another embodiment of the turning mechanism 10. As seen more particularly from FIG. 3b, a turning maneuver is in progress. A base 12 is shown which includes a bottom surface 14. A mounting plate 16 is attached to the bottom surface 14 of the base 12. A caster 18 is secured to the mounting plate 16. The mounting plate 16 provides a reinforced surface for attaching the caster 18. The caster 18 includes an axle 20 to which a wheel 22 is mounted. The caster 18 is capable of rotating about a swivel axis z. This particular embodiment of the turning mechanism 10 incorporates a pair of rotation limiters 32 which take the form of a spring. The rotation limiters 32 are positioned one on either side of the caster 18. Each rotation limiter 32 is attached at one end to the bottom surface 14 of the base 12. The opposite end of each of the rotation limiter 32 is attached to the corresponding end of the axle 20. Each rotation limiter 32 exerts a tension force on the caster 18 which urges it to rotate in the direction of the rotation limiter 32. The rotation limiters 32 function to maintain the caster 18 in a straight orientation when the base 12 is horizontal, and to prevent the caster 18 from swivelling excessively during turns.

Figure 4A:
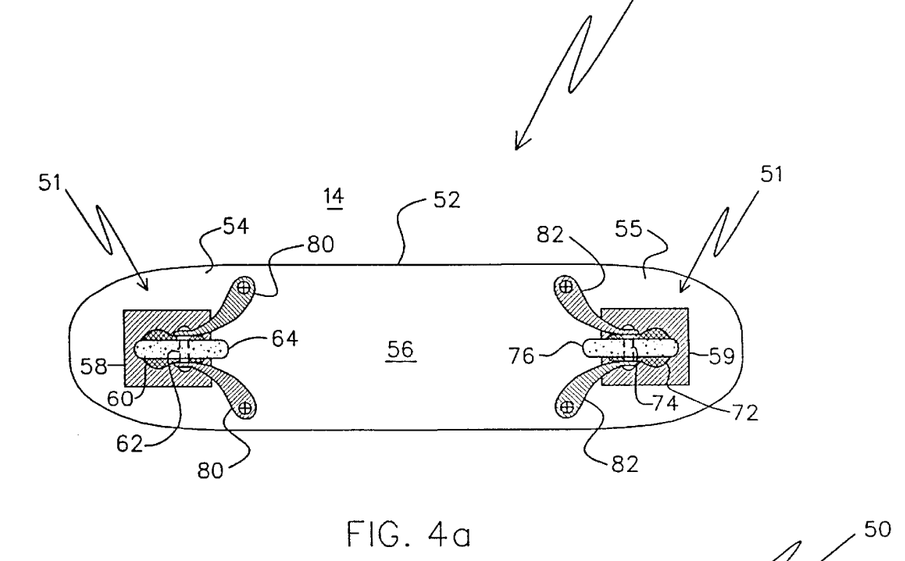
FIG. 4a is a bottom plan view of a skateboard which utilizes the turning mechanism.
Figure 4B:
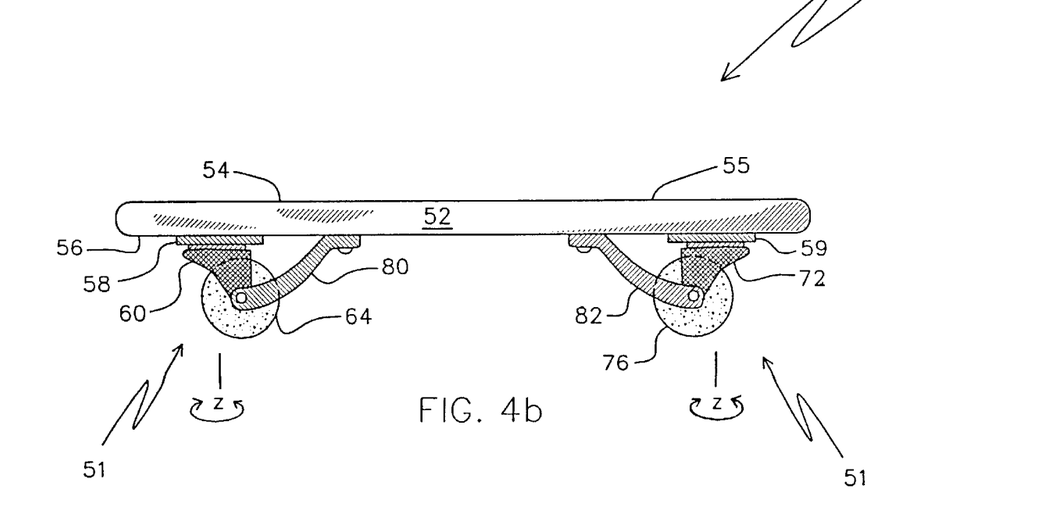
FIG. 4b is a side elevational view of a skateboard which utilizes the turning mechanism.

FIGS. 4A and 4B illustrate a skateboard 50 adapted to incorporate a turning mechanism 51 as previously described. The skateboard 50 includes a base 52 which has a front portion 54, a rear portion 55, and a bottom surface 56. A first mounting plate 58 is positioned at the front portion 54 of the base 52. The first mounting plate 58 is then attached to the bottom surface 56 of the base 52. A second mounting plate 59 is positioned at the rear portion 55 of the base 52. The second mounting plate 59 is then attached to the bottom surface 56 of the base 52.

A first caster 60 is rotated so that it is facing forwardly and secured to the first mounting plate 58. The first caster 60 includes a first axle 62. A first wheel 64 is mounted on the first axle 62. The first caster 60 is also capable of rotating about a swivel axis z. A second caster 72 is rotated so that it is facing rearwardly and secured to the second mounting plate 59. The second caster 72 includes a second axle 74. A second wheel 76 is mounted on the second axle 74. The second caster 72 is capable of rotating about a swivel axis z.

A first pair of rotation limiters 80 is positioned with each rotation limiter 80 on one side of the first caster 60. In a preferred embodiment, the rotation limiter may be an elastomeric band. Each of the first pair of rotation limiters 80 is attached at one end to the corresponding end of the first axle 62. The opposite end of each of the first pair of rotation limiters 80 is attached to the bottom surface 56 of the base 52. Each of the first pair of rotation limiters 80 applies a tension force to the first caster 60 which urges it to rotate in the direction of the rotation limiter 80. The net result of these tension forces causes the first caster 60 to remain in a straight orientation when the base 12 is positioned horizontally.

A second pair of rotation limiters 82 is positioned with each rotation limiter 82 on one side of the second caster 72. Each of the second pair of rotation limiters 82 is attached at one end to the corresponding end of the second axle 74. The opposite end of each of the second pair of rotation limiters 82 is attached to the bottom surface 56 of the base 52. Each of the second pair of rotation limiters 82 applies a tension force to the second caster 72. The net result of these tension forces maintains the second caster in a straight orientation. As illustrated in FIGS. 4a and 4b, the first and second pair of rotation limiters 80, 82 take the form of elastomeric bands.

Figure 5A:
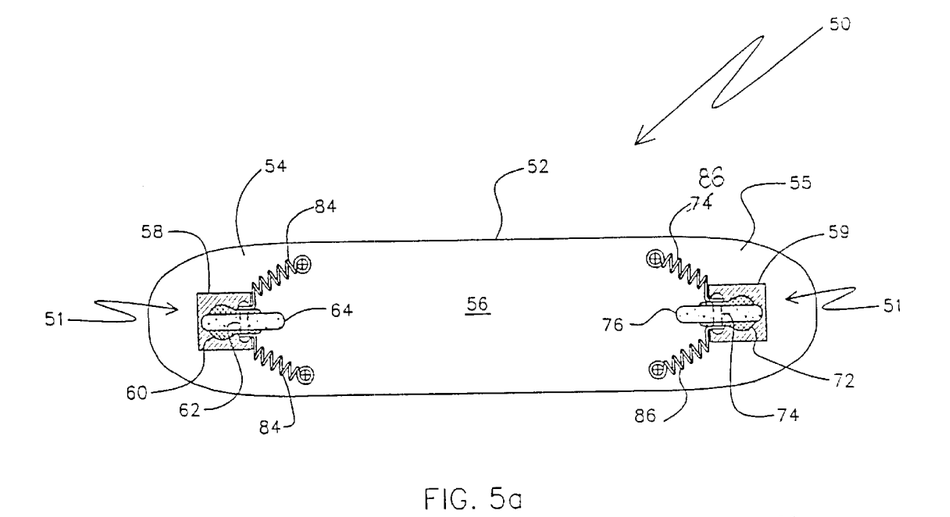
FIG. 5a is a bottom plan view of an embodiment of the skateboard which utilizes a spring as a rotation limiter.
Figure 5B:
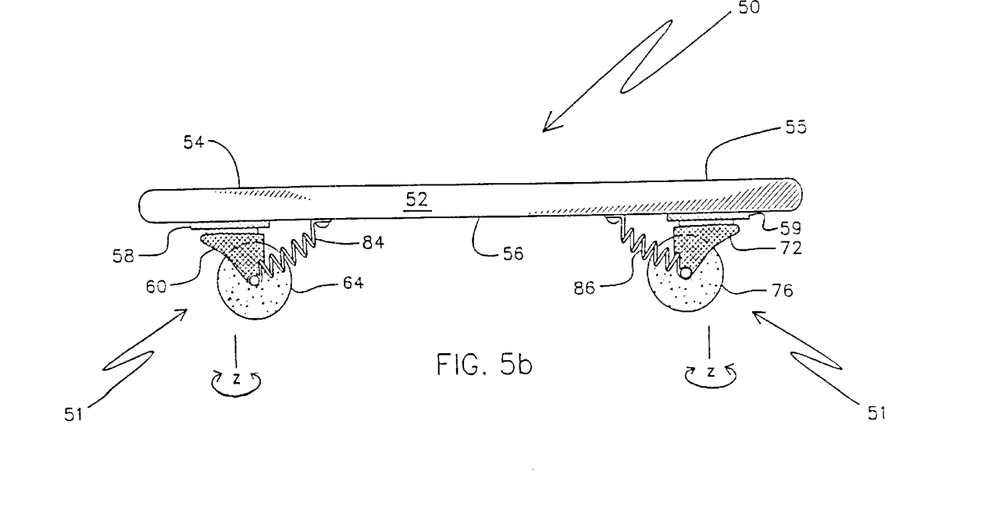
FIG. 5b is a side elevational view of the same embodiment.

Turning now to FIGS. 5a and 5b, an alternative embodiment of a skateboard 50 is illustrated. The skateboard 50 includes a base 52 which has front portion 54, a rear portion 55, and a bottom surface 56. A first mounting plate 58 is positioned at the front portion 54 of the base 52. The first mounting plate 58 is next attached to the bottom surface 56 of the base 52. A second mounting plate 59 is positioned at the rear portion 55 of the base 52. The second mounting plate 59 is then attached to the bottom surface 56 of the base 52.

A first caster 60 is rotated so that it is facing forwardly and secured to the first mounting plate 58. The first caster includes a first axle 62 to which a first wheel 64 is mounted. The first caster 60 is capable of rotating about a swivel axis z. A second caster 72 is rotated so that it is facing rearwardly and secured to the second mounting plate 59. The second caster 72 includes a second axle 74 to which a second wheel 76 is mounted. The second caster 72 is capable of rotating about a swivel axis z.

A first pair of rotation limiters 84 is positioned with each rotation limiter 84 on one side of the first caster 60. Each of the first pair of rotation limiters 84 is attached at one end to the corresponding end of the first axle 62. The opposite end of each of the first pair of rotation limiters 84 is attached to the bottom surface 56 of the base 52. A second pair of rotation limiters 86 is positioned with each rotation limiter 86 on one side of the second caster 72. Each of the second pair of rotation limiters 86 is attached at one end to the corresponding end of the second axle 74. The opposite end of each of the second pair of rotation limiters 86 is attached to the bottom surface 56 of the base 52. As illustrated in FIGS. 5A and 5B, this embodiment incorporates a first and second pair of rotation limiters 86 which take the form of springs.

Figure 6A:
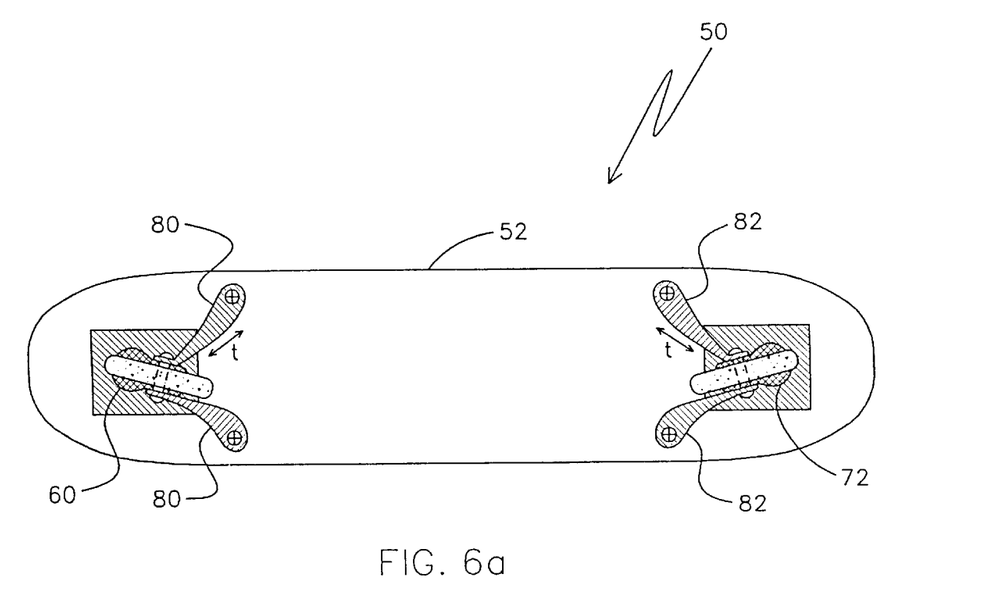
FIG. 6b is a front elevational view of a skateboard during a turn.
Figure 6B:
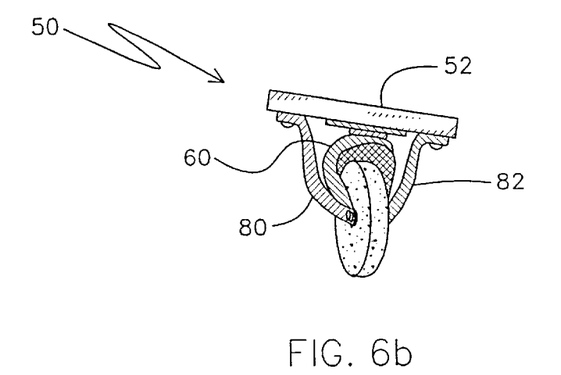

FIGS. 6a and 6b illustrate a skateboard 50 engaged in a turning maneuver. With particular reference to FIG. 6a, the base 52 of the skateboard 50 is shown tilted in the direction of turn. As a result, the first caster 60 is forced to rotate in the direction of the turn. The second caster 72, on the other hand, rotates in the opposite direction. The force applied to the base 52 in order to tilt it in the turning direction also places an increased tension t in one rotation limiter from the first pair of rotation limiters 80 and one rotation limiter from the second pair of rotation limiters 82. These increased tensions act respectively on the on the first and second casters 60 and 72 to reduce the degree of swivelling which would normally occur.

Figure 7A:
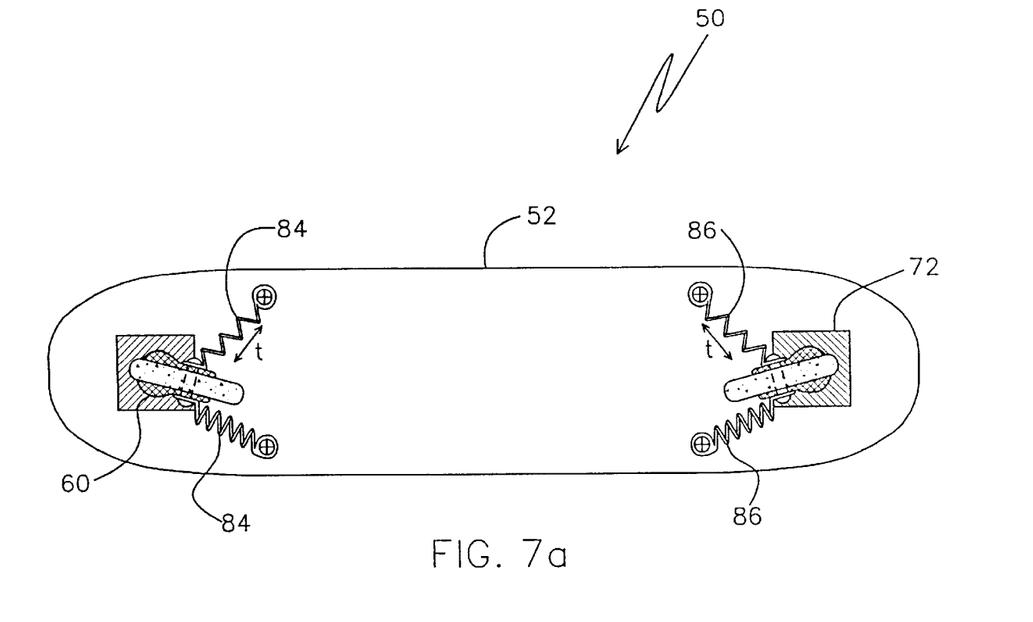
FIG. 7b is a front elevational view of the same embodiment during a turn.
Figure 7B:
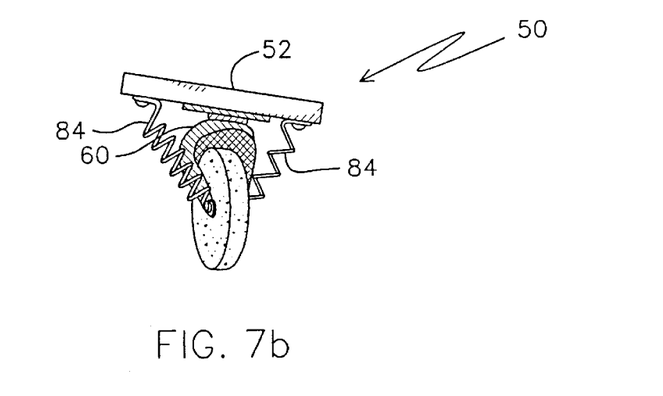

FIGS. 7a and 7b illustrate an embodiment of the skateboard 50 which employs springs as rotation limiters. The skateboard is illustrated while engaged in a turning maneuver. With particular reference to FIG. 7b, the base 52 of the skateboard 50 is shown tilted in the direction of turn. As a result, the first caster 60 is forced to swivel in the direction of the turn. The second caster 72, on the other hand, rotates in the opposite direction. The force applied to the base 52 in order to tilt it in the turning direction also places an increased tension in one rotation limiter from the first pair of rotation limiters 84 and one rotation limiter from the second pair of rotation limiters 86. These increased tensions t act on the first and second casters 60 and 72, respectively, to reduce the degree of swivelling which would normally occur.

Figure 8A:
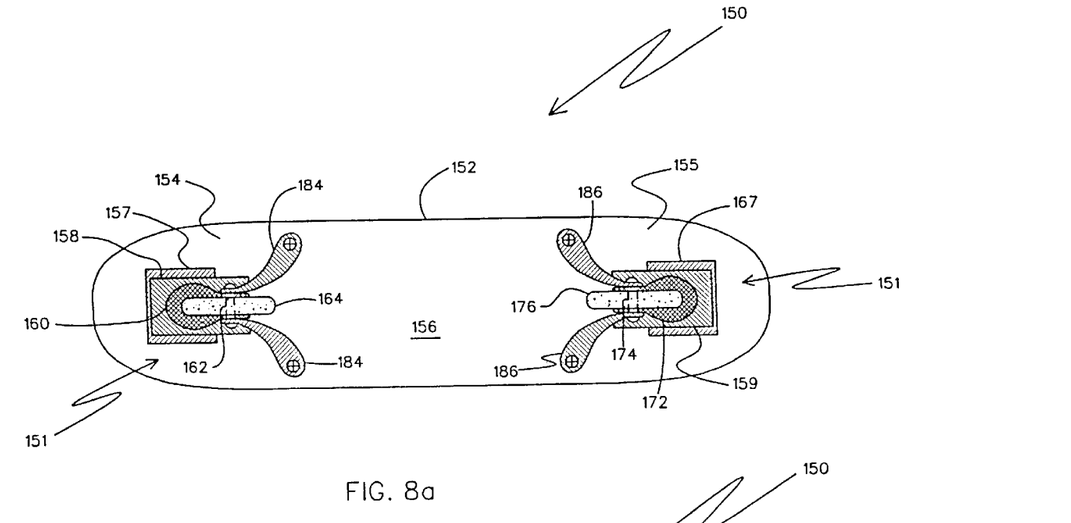
FIG. 8a is a bottom plan view of another embodiment of the skateboard, which utilizes a caster mount and a mounting plate to secure the casters.
Figure 8B:
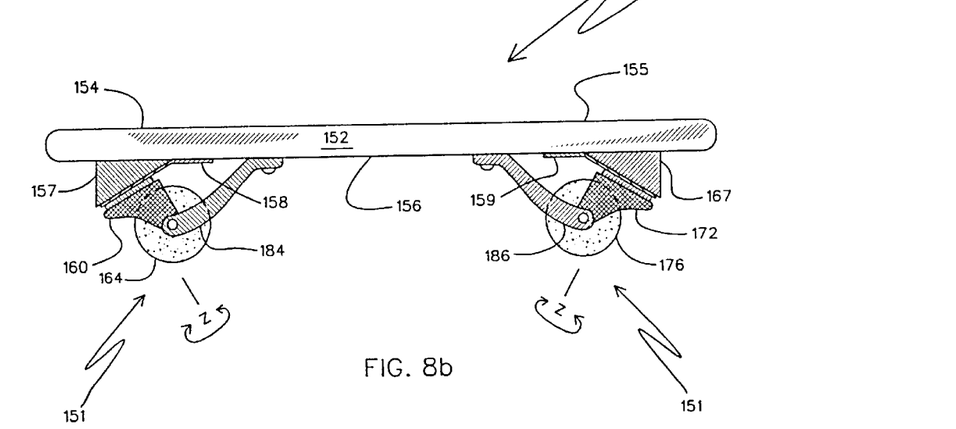
FIG. 8b is a side elevational view of another embodiment of the skateboard, which utilizes a caster mount and a mounting plate to secure the casters.

FIGS. 8a and 8b illustrate yet another embodiment of a skateboard 150 equipped to adapt a turning mechanism 151. The skateboard 150 includes a base 152 which has front portion 154, a rear portion 155, and a bottom surface 156. A first mounting block 157 is positioned at the front portion 154 of the base 152 and secured to the bottom surface 156 of the base 152. A second mounting block 167 is positioned at the rear portion 155 of the base 152 and secured to the bottom surface 156 of the base 152. The first and second mounting blocks, 157 and 167, have a right triangular profile and are positioned so that their hypotenuses generally face each other. A first mounting plate 158 is angled to correspond to the angular displacement between the base 152 and the hypotenuse of the first mounting block 157. The first mounting plate 158 is then secured to both the first mounting block 157 and the bottom surface 156 of the base 152. A second mounting plate 159 is angled to correspond to the angular displacement between the base 152 and the hypotenuse of the second mounting block 167. The second mounting plate 159 is then secured to both the second mounting block 167 and the bottom surface 156 of the base 152.

A first caster 160 is rotated so that it is facing forwardly and secured to the first mounting plate 158. The first caster includes a first axle 162 to which a first wheel 164 is mounted. The first caster 160 is capable of rotating about a swivel axis z. A second caster 172 is rotated so that it is facing rearwardly and secured to the second mounting plate 159. The second caster 172 includes a second axle 174 to which a second wheel 176 is mounted. The second caster 172 is also capable of rotating about a swivel axis z. The first and second mounting blocks, 157 and 167 offset the swivel axis z such that it is not perpendicular to the ground surface. By offsetting the swivel axis z, there is a natural tendency for the first and second casters 160, 172 to maintain a straight orientation. Furthermore, when the first and second casters 160, 172 are rotated a specific angular displacement, the turning radius that would normally be traced with a swivel axis perpendicular to the ground is reduced due to the offset of the swivel axis z. Thus, the base 152 must also be tilted to a greater degree than necessary in a skateboard without the mounting blocks 157, 167 in order for the first and second casters 160 and 172 to trace the same turn.

A first pair of rotation limiters 184 is positioned with each rotation limiter 184 on one side of the first caster 160. Each of the first pair of rotation limiters 184 is attached at one end to the corresponding end of the first axle 162. The opposite end of each of the first pair of rotation limiters 184 is attached to the bottom surface 156 of the base 152. A second pair of rotation limiters 186 is positioned with each rotation limiter 186 on one side of the second caster 172. Each of the second pair of rotation limiters 186 is attached at one end to the corresponding end of the second axle 174. The opposite end of each of the second pair of rotation limiter 186 is attached to the bottom surface 156 of the base 152. Turning of this particular embodiment is accomplished in essentially the same manner previously described.

It will be appreciated that there are various modifications that may be made to the disclosed embodiments. For example, there are numerous materials that the rotation limiters can be made from. Also, the degree of offset applied to the swivel axis may be varied by selectively choosing the angles of the mounting blocks. Furthermore, the rotation limiters may be attached to various locations within the assembly. For example, one end of a rotation limiter may be attached to an axle while the opposite end is attached to the mounting block.

While the invention has been described with reference to selected preferred embodiments, it should not be limited to those embodiments. Rather, many modifications and variations will become apparent to those skilled in the art without departure from the scope and spirit of this invention as defined in the appended claims.

What is claimed is:

1. A tandem wheeled vehicle, said vehicle having a planar base having a first end, a second end and a middle section therebetween, comprising:

a first caster mounted proximate said first end of said base, said first caster having a rotational axis, said first caster mounted with said rotational axis defining an acute angle relative to said middle section, said first caster also having an axle disposed substantially perpendicularly with respect to said rotational axis, said axle having a first end and a second end;

a wheel mounted to said first caster axle and operatively arranged for rotation about said first caster axle;

a first rotational limiter mounted to said base and to said first end of said first caster axle;

a second rotational limiter mounted to said base and to said second end of said first caster axle, wherein said first and second rotational limiters are operatively arranged to exert substantially equal force on said first caster tending to maintain said first caster in an equilibrium condition;

a second caster mounted proximate said second end of said base, said second caster having a rotational axis, said second caster mounted with said rotational axis defining an acute angle relative to said middle section, said second caster also having an axle disposed substantially perpendicularly with respect to said rotational axis, said axle having a first end and a second end;

a wheel mounted to said second caster axle and operatively arranged for rotation about said second caster axle;

a third rotational limiter mounted to said base and to said first end of said second caster axle; and, a fourth rotational limiter mounted to said base and to said second end of said second caster axle, wherein said third and fourth rotational limiters are operatively arranged to exert substantially equal force on said second caster tending to maintain said second caster in an equilibrium condition.

2. A tandem wheeled vehicle as recited in claim 1 wherein said first, second, third and fourth rotational limiters are elastomeric bands.

3. A tandem wheeled vehicle as recited in claim 1 wherein said first, second, third and fourth rotational limiters are springs.

* * * * *